United States Patent [19]

Vara et al.

[11] Patent Number: 4,689,054
[45] Date of Patent: Aug. 25, 1987

[54] PROCESS FOR THE REMOVAL AN DISPOSAL OF AIRBORNE CONTAMINANTS FROM PAINT BOOTHS AND THE LIKE

[75] Inventors: Tomas E. Vara; Jerry L. Mestemaker; Bob R. Thakker, all of Vero Beach, Fla.

[73] Assignee: Vara International, Inc., Vero Beach, Fla.

[21] Appl. No.: 816,891
[22] Filed: Jan. 7, 1986
[51] Int. Cl.$^4$ .................. B01D 53/04; B01D 53/12
[52] U.S. Cl. ............................... 55/61; 55/62; 55/74; 55/79
[58] Field of Search ...................... 55/59–62, 55/74, 77–79, 179–181, 208, 267, 268, 387, DIG. 46, 18, 20, 21

[56] References Cited

U.S. PATENT DOCUMENTS

| | | | |
|---|---|---|---|
| 1,402,340 | 1/1922 | Burrell et al. | 55/180 |
| 1,595,681 | 8/1926 | Oberfell | 55/62 |
| 1,595,683 | 8/1926 | Burrell et al. | 55/59 |
| 2,114,810 | 4/1938 | Ray | 55/62 X |
| 2,330,655 | 9/1943 | Zucker | 55/180 X |
| 2,585,491 | 2/1952 | Olsen . | |
| 3,061,992 | 11/1962 | Russell | 55/62 X |
| 3,087,291 | 4/1963 | Jackson et al. | 55/62 |
| 3,121,002 | 2/1964 | Kilgore et al. | 55/180 X |
| 3,455,089 | 7/1969 | Mattia | 55/62 |
| 3,534,529 | 10/1970 | Mattia | 55/62 |
| 3,596,438 | 8/1971 | Beukenkamp et al. | 55/59 |
| 3,674,685 | 7/1972 | Arden et al. | 210/189 X |
| 4,085,043 | 4/1978 | Ellis | 210/189 X |
| 4,124,528 | 11/1978 | Modell | 210/186 X |
| 4,197,195 | 4/1980 | Ochsenfeld et al. | 210/664 |
| 4,252,643 | 2/1981 | Knehig et al. | 210/662 |
| 4,257,783 | 3/1981 | Gutjahr et al. | 55/61 |
| 4,287,161 | 9/1981 | Agrawal | 55/48 X |
| 4,289,505 | 9/1981 | Hardison et al. | 55/59 |
| 4,400,553 | 8/1983 | Aneja | 210/806 X |
| 4,414,003 | 11/1983 | Blaudszun | 55/59 X |
| 4,421,532 | 12/1983 | Sacchetti et al. | 55/59 X |
| 4,427,550 | 1/1984 | Priestly | 210/675 |
| 4,455,234 | 6/1984 | Markham et al. | 210/638 |
| 4,480,393 | 11/1984 | Flink et al. | 55/62 X |
| 4,487,614 | 12/1984 | Yon | 55/59 X |
| 4,517,094 | 5/1985 | Beall | 210/664 |
| 4,536,197 | 8/1985 | Cook | 55/59 X |
| 4,544,488 | 10/1985 | O'Brien | 210/664 |
| 4,565,553 | 1/1986 | Nowack | 55/59 |
| 4,589,890 | 5/1986 | Gronvaldt | 55/59 |

FOREIGN PATENT DOCUMENTS

| | | | |
|---|---|---|---|
| 2847714 | 5/1980 | Fed. Rep. of Germany | 55/59 |
| 3316062 | 11/1984 | Fed. Rep. of Germany | 55/59 |
| 2867 | 1/1977 | Japan | 55/59 |

OTHER PUBLICATIONS

"Spontaneous Combustion of Carbon Beds" by A. A. Noujokas, Plant/Operations Process 4/85.
"Vapor-Phase Adsorption Cuts Pollution, Recovers Solvents" by Parmele O'Connell & Basdekus, Chem. Engineering 12/79.
"Special Report: Volatile Organic Compounds" by Paul Cheremisin off Pollution Engineering 3/85.
Vara International, "Solvent Recovery System Controls Pollution While Saving Money", Spring 1985.
Vara International, "Solvent Recovery-Answer to Efficient Pollution Control in Production of Pressure Sensitive Materials", Spring 1985.

Primary Examiner—Robert Spitzer
Attorney, Agent, or Firm—Steele, Gould & Fried

[57] ABSTRACT

A process is provided for the removal and disposal of airborne contaminants from paint booths and the like. The process includes the steps of passing the effluent air stream from a paint booth through an adsorber in at least one adsorber. The adsorbent is preferably activated carbon. The adsorbent is regenerated periodically by a regeneration step. The regeneration step is preferably performed by passing a regenerating fluid through the adsorber. The regenerating fluid removes the contaminants from the adsorbent and transports the contaminants out of the adsorber. The regenerating fluid is preferably partially or totally scrubbed of contaminants and recycled through the process to provide an essentially closed-loop operating system. The regenerating fluid is preferably a vapor or gas which is partially or totally cooled and condensed after regeneration. The condensate is separated in one or more steps into contaminant rich fractions and contaminant poor fractions. The contaminant rich fractions are preferably incinerated, where the contaminants are consumed as fuels.

25 Claims, 2 Drawing Figures

PROCESS FOR THE REMOVAL AN DISPOSAL OF AIRBORNE CONTAMINANTS FROM PAINT BOOTHS AND THE LIKE

BACKGROUND OF THE INVENTION

1. Field of the Invention

This invention relates generally to processes for the removal and disposal of airborne contaminants, and particularly to processes for the removal and disposal of airborne contaminants in effluent air streams from paint booths and the like.

2. Description of the Prior Art

The effluent air stream from industrial paint booths and the like may contain a number of airborne contaminants. The constitution of these contaminants depends upon the particular paints and solvents which are utilized, but typically an array of both water insoluble and water soluble contaminants is present. Examples of water insoluble contaminants which might be present would include hexanes, heptanes, octanes, nonanes xylenes, naphthas, and mineral spirits. Examples of water soluble contaminants which might be present would include alcohols, ketones, esters, and ethers. Other contaminants may include water soluble but high boiling substances such as glycol ethers. Airborne particulate contaminants may also be present.

The Environmental Protection Agency of the United States government has mandated strict adherence to goverment clean air standards. These standards require the removal of solvents and other contaminants from the effluent streams from paint booths and the like prior to venting these streams to the atmosphere. Strict government standards also regulate liquid effluents, and therefore a process without liquid effluents is desirable.

It is desirable to avoid the excessive release of water vapor to the atmosphere. Large amounts of water vapor released to the atmosphere, in some climatic conditions, can cause steam plumes and ice formation in cold climates and rain in warm climates. Large amounts of vapor produced in a process cannot be efficiently stored should a process component break down. It is therefore necessary to have standby components on hand or shut down the process. It is also desirable of course to keep the operating costs of such a process to a minimum.

The presence of substances such as carbon oxides, sulphur, or chlorinated compounds in exiting gas streams may result in the release of acids into the atmosphere. It is therefore sometimes necessary to scrub the gas streams leaving the process to remove these components. It would be desirable to provide a process which can be readily adapted to remove these substances.

The auto industry in particular has had difficulty in meeting clean air objectives while avoiding excessive operating costs. The magnitude of painting processes in the auto industry, and particularly the spray painting processes, produce a very large air and contaminant flow which is difficult to economically treat by conventional processes. Higher operating costs must ultimately of course be passed along to the consumer.

The technology of unit operations capable of performing specific separation functions for most chemicals at commonly encountered operating conditions is well known in the chemical engineering art. The art has not heretofore known, however, a satisfactory process for removing airborne contaminants from the effluent air streams of paint booths and the like, and especially from the effluent air streams from spray paint booths of the sort used in the auto industry.

SUMMARY OF THE INVENTION

It is an object of the invention to provide a process for the removal and disposal of airborne contaminants in the effluent air stream from paint booths and the like.

It is another object of the invention to provide a process for the removal and disposal of airborne contaminants in the effluent air stream from paint booths and the like which incorporates a purifying medium which can be regenerated.

It is another object of the invention to provide a process for the removal and disposal of airborne contaminants in the effluent air stream from paint booths and the like which is especially useful for treating the effluent air stream from spray paint booths of the sort used by the auto industry.

It is yet another object of the invention to provide a process for the removal and disposal of contaminants in the effluent air stream from paint booths and the like which is both efficient and environmentally safe.

It is still another object of the invention to provide a process for the removal and disposal of contaminants in the effluent air stream from paint booths and the like which will not require excessive operating expenses.

It is yet another object of the invention to provide a process for the removal and disposal of contaminants in the effluent air stream from paint booths and the like which will require small make-up additions to the regenerating fluid during operation.

It is still another object of the invention to provide a process for the removal and disposal of airborne contaminants in the effluent air stream from paint booths and the like which will not emit large amounts of water vapor into the atmosphere.

It is still another object of the invention to provide a process for the removal and disposal of airborne contaminants in the effluent air stream from paint booths and the like which can be readily modified to scrub acidic components or other contaminants from the fluid streams exiting the process.

These and other objects are accomplished by a process for the removal and disposal of airborne contaminants in the effluent air stream from paint booths and the like in which the air stream is passed through at least one adsorber. The adsorber preferably contains an adsorbent such as activated carbon. The process preferably includes regeneration of the adsorbent. Regeneration of the adsorbent is preferably accomplished by passing a regenerating fluid through the adsorber. The regenerating fluid removes the contaminants from the adsorbent and carries the contaminants out of the adsorber. It is preferable to recycle the regenerating fluid. The regenerating fluid is separated into contaminant rich and contaminant poor fractions. The contaminant rich fractions are preferably consumed as fuels in an incineration step. The contaminant poor fractions are recycled for regeneration of the adsorbent and other uses.

The regenerating fluid is preferably a vapor or gas. Steam is a preferable regenerating vapor. Nitrogen gas and inert gases are also suitable. Separation of the gas regenerating fluid into contaminant rich and contaminant poor fractions is preferably accomplished by first condensing, or compressing and condensing, the regenerating vapor leaving the adsorber. The condensed regeneration products are separated into a contaminant rich fraction and a contaminant poor fraction. The contaminant rich fraction may then be removed and preferably incinerated.

The initial separation into contaminant rich and contaminate poor fractions is preferably accomplished by decanting. The contaminant poor fraction obtained may undergo further separation processes to remove remaining contaminants. The liquid phase contaminant poor fraction is preferably routed to stripping means, for example, a stripping column. Heated regenerating fluid in the gas or vapor phase is preferably supplied to the stripping means. Contaminants are stripped from the contaminant poor fraction and taken off the stripping means in the vapor phase. A portion of this relatively contaminant rich stream removed from the stripping means may be recycled back to the stripping means. The portion not returned to the column is removed and can be incinerated. A regenerating fluid of reduced contaminant concentration is also removed from the stripping means.

The regenerating fluid of reduced contaminant concentration leaving the stripping means may still contain some contaminants which are difficult to separate from the regenerating fluid. It is desirable to treat the regenerating fluid at this or another appropriate point to a suitable separation process for the particular contaminants encountered. Ion exchange, liquid adsorption, or liquid-liquid extraction can, for example, be used to remove particular contaminants from the regenerating fluid stream.

The contaminant rich fractions are preferably routed to an incinerator where they are consumed as fuel, resulting in the production of carbon dioxide, water, and other trace components. The incinerator may require an input of energy in addition to the fuel value of the contaminant fractions to drive the combustion reaction. Natural gas, fuel oil, or coal may be used as fuels for incineration processes.

The regenerating fluid is preferably heated prior to contact with the adsorbent, and also before it is supplied to the stripping means. Efficient utilization of energy inputs is accomplished by using the heat of the effluent stream from the incinerator to heat the recirculating regenerating fluid. This is conveniently accomplished in a waste heat boiler or other suitable heat exchanger.

Filtration of particulates is preferably performed before the air stream is passed through the adsorber. It is also desirable to preheat the air stream prior to contact with the adsorbent. This may be accomplished by contacting the air stream with the heated regenerating fluid in a suitable heat exchanger.

The adsorber may be of any type known in the art, including upflow or downflow, fixed bed, rotary bed and fluidized bed adsorbers. Contact of the contaminant laden air stream with the adsorbent in a fixed bed adsorber is preferably made with the air stream flowing downward in the direction of the force of gravity. In this manner, the topmost layer of adsorbent will become deactivated first and can be readily removed from the adsorber by raking it from the top of the bed. Alternate means of removing the adsorbent which is first deactivated can be provided. Regenerating fluid flow in a fixed bed adsorber is preferably opposite the direction of the air stream flow through the adsorber. In this manner, adsorbent nearest the air stream outlet from the adsorber is thoroughly cleaned of contaminants so that when the air stream is again directed through the adsorber there will not be an escape of contaminants to the atmosphere.

If large quantities of air must be treated, multiple adsorbers can be connected in parallel. At least two adsorbers connected in parallel are preferable so that at least one adsorber can be in use while at least one other adsorber is being regenerated. It may also be desirable to contact the air stream with multiple adsorbent beds connected in series.

The process of the invention is readily adaptable to known control systems. Process control techniques may be used to monitor and alter operating parameters according to the requirements of the process. Adsorbers may be alternately switched from the adsorption mode to the regeneration mode in an efficient manner, for example. Energy inputs may be adjusted according to air stream and ambient conditions. The process is especially adaptable to computer control techniques.

Apparatus is provided for performing the process of the invention. The apparatus includes structure for passing the effluent air stream of paint booths and the like through at least one adsorber for removing contaminants from the air stream. The adsorbent is preferably activated carbon. The apparatus also preferably includes structure for regenerating the adsorbent. This structure preferably includes structure for passing a regenerating fluid through the adsorber. Separation structure is preferably provided to remove contaminants from the regenerating fluid such that the regenerating fluid can be recycled. The separation structure can be mechanical, such as a decanter. Additional separation structure may include stripping columns, liquid adsorption, ion exchange, and liquid-liquid extraction apparatus. The contaminants are preferably incinerated in incineration structure. Heat exchange structure preferably is provided to transfer heat from the incinerator effluent stream to the recirculating regenerating fluid.

BRIEF DESCRIPTION OF THE DRAWINGS

There are shown in the drawings embodimets which are presently preferred it being understood, however, that the invention is not limited to the precise arrangements and instrumentalities shown, wherein.

DETAILED DESCRIPTION OF THE PREFERRED EMBODIMENTS

Figure 1:
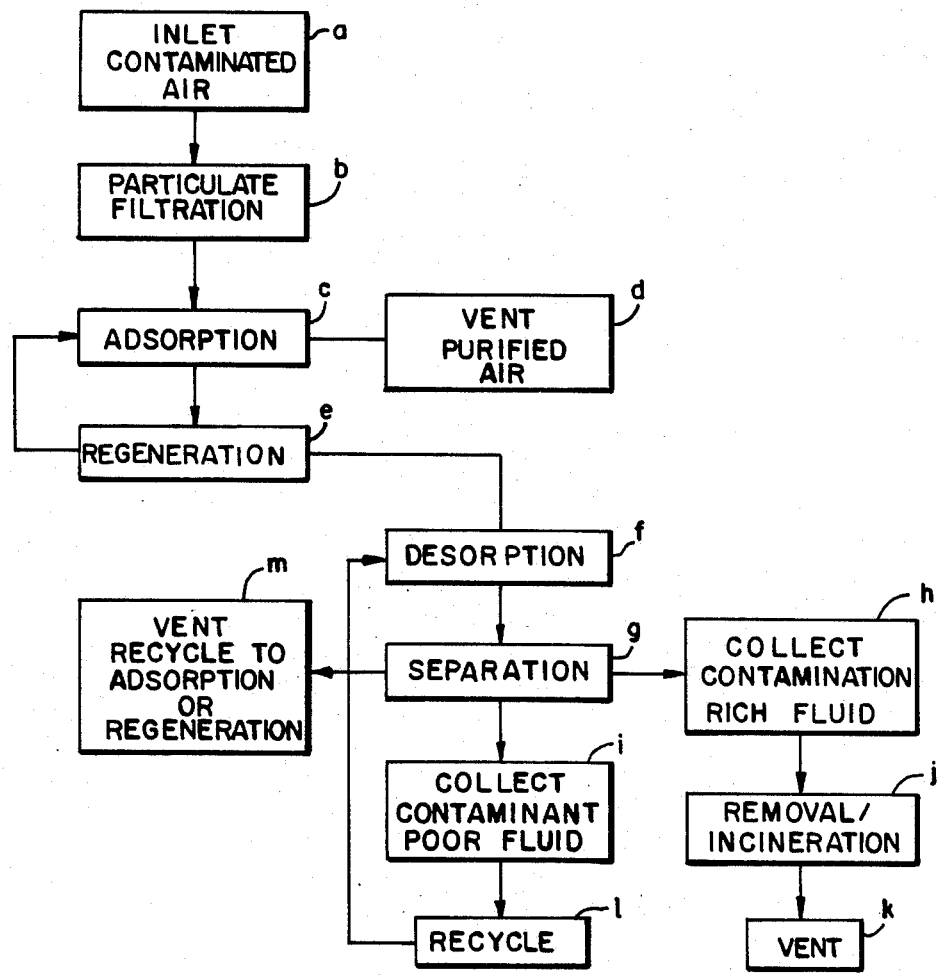
FIG. 1 is a block diagram of a process according to the invention.

The process and apparatus of the invention provide for purification of the effluent air stream from paint booths and the like utilizing an adsorbent, and especially for the purification of the effluent air stream from paint booths used in the auto industry. The painting process may be a spray painting process, or other painting processes which contaminate the air with solvent vapors and other contaminants. The process and apparatus of the invention preferably provide for essentially closed-loop regeneration of the adsorbent, as shown by the block diagram in FIG. 1. The contaminated air stream is transferred to the process (FIG. 1(a)) and preferably is filtered for particulate matter (FIG. 1(b)). The contaminated air stream is then passed through one or more adsorbers containing an adsorbent where the contaminants are removed from the air stream (FIG. 1(c)), preferably by an activated carbon adsorbent. The purified air stream may then be vented to the atmosphere (FIG.

1(*d*)). The regeneration process (FIG. 1(*e*)) according to the invention includes passing a regenerating fluid past the adsorbent to desorb the adsorbed contaminants (FIG. 1(*f*)). The regenerating fluid undergoes one or more separation processes (FIG. 1(*g*)) to produce contaminant rich (FIG. 1(*h*)) and contaminant poor (FIG. 1(*i*)) fractions. The contaminant rich fractions are removed and may be incinerated (FIG. 1 (*j*)), where they are consummed as fuels. Exhaust gas from the incinerator can then be vented (FIG. 1(*k*)). The contaminant poor fractions may be recycled for regeneration and other uses (FIG. 1(*l*)). A vent from the separation step returns air removed by the regenerating fluid from the adsorber to the adsorbtion step, or non-condensed regenerating fluid to the regeneration step (FIG. 1(*m*)). Make-up regenerant is added as necessary. The adsorption step in any one adsorber is preferably alternated with the regeneration step (FIG. 1(*c,e*)).

Figure 2:
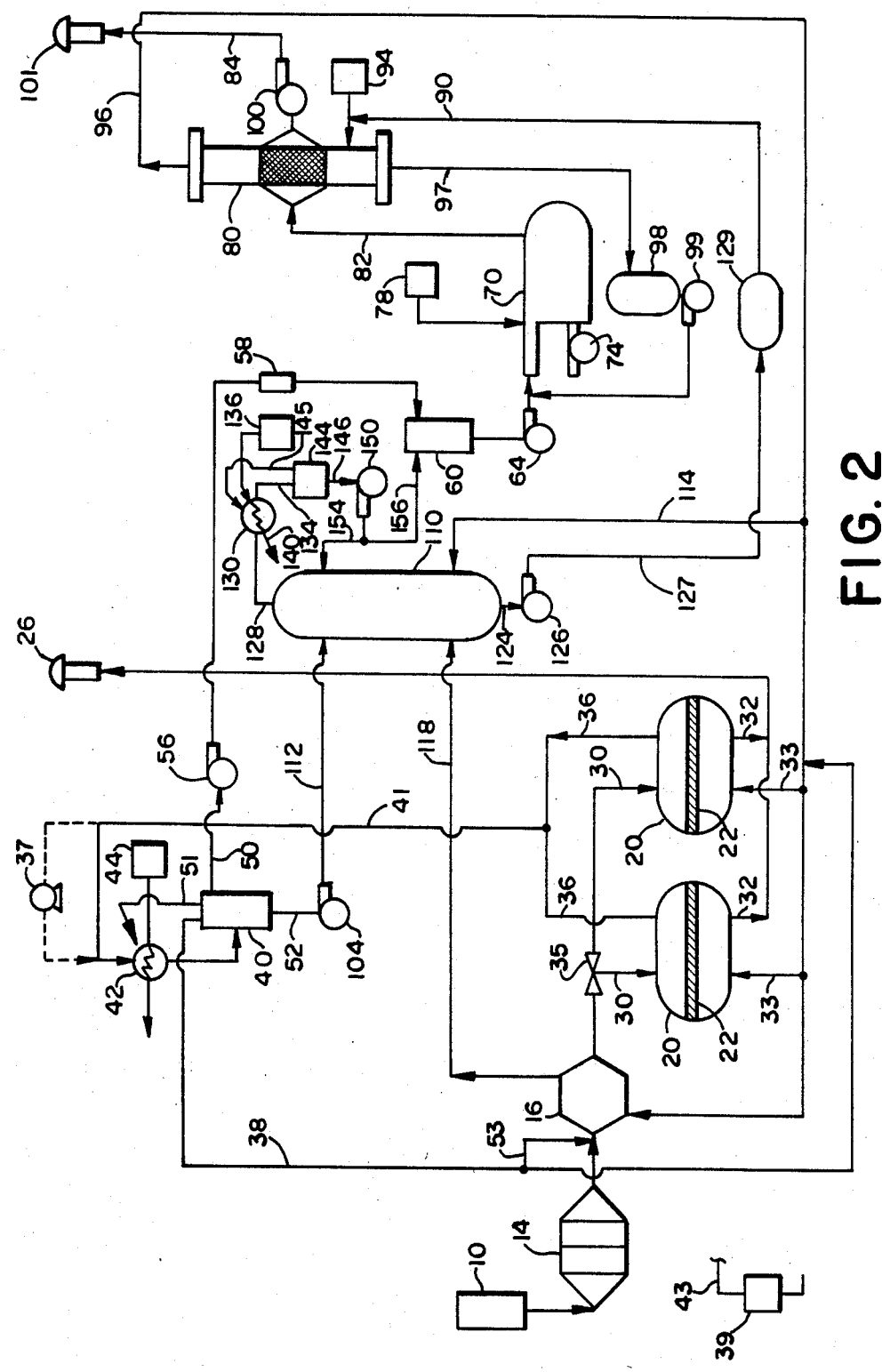
FIG. 2 is a schematic diagram of one embodiment of a process according to the invention.

One enbodiment of the process and apparatus of the invention is best understood with reference to the schematic diagram in FIG. 2. The effluent air stream leaving the paint booths and the like is shown entering the process at inlet means 10. The air stream is passed through particulate filter means 14. The particulate filter means 14 removes relatively large diameter airborne particles such as aerosols or pigments from the air stream. The particulate filter means 14 may be of any suitable design known for this purpose, and may include cloth, carbon, or a scrubbing liquid as the filter media. It is preferable to provide three particulate filter stages, as shown.

The air stream leaving the particulate filter means 14 is preferably passed through heat exchanger means 16 prior to the adsorption step. The air stream is then routed to one or more adsorber means 20. The adsorber means 20 may be of the fixed bed, fluidized bed, rotary bed, or compartment design, or of any other design suitable for this purpose. It has to date been found preferable to use adsorbers of the fixed bed design.

Each adsorber means 20 contains a charge of adsorbent material 22. The adsorbent material 22 may be selected from any suitable substance known for this purpose. Activated carbon is regenerable with heated fluids, and has been found to be preferable for adsorbing the contaminants in the effluent of paint booths, and particularly spray paint booths, of the sort used by the auto industry. These contaminants may include hexanes, heptanes, octanes, nonanes, xylenes, naphthas, and mineral spirits, as well as alcohols, ketones, esters, and ethers. Other contaminants may be present, depending upon the painting process that is used by the particular auto manufacturer or painter.

The contaminants in the air stream are adsorbed by the adsorbent, and the air stream leaving the adsorption stage can be vented to the atmosphere, as by venting means 26. If complete adsorption cannot be accomplished in a single stage, it is within the scope of the invention to provide one or more adsorption stages in series until the desired purity of the effluent air stream leaving the adsorption stage is obtained.

The adsorbent may be replaced or regenerated as required by the operating conditions of the process. It is desirable from an economic standpoint to regenerate the adsorbent. The frequency of regeneration that is required will of course depend upon a number of factors including the volumetric flow rate of the inlet air stream to the process, the concentration and composition of the contaminants, and the ambient conditions.

Regeneration is preferably accomplished by shutting off the flow of the inlet air stream through the adsorber being regenerated, and passing a regenerating fluid through the adsorber. The regenerating fluid may be a liquid such as heater water, but preferably is a vapor or gas. Suitable regenerating fluids include water, steam, nitrogen and inert gases. Steam is a preferable regenerating fluid. The regenerating fluid supplies energy to the adsorbent to drive off the contaminants. The contaminants are then carried away from the adsorbent by the flow of the regenerating fluid.

The adsorber may be of any suitable design for this purpose, including fixed bed, fluidized bed, rotary bed, or the compartment designs. In adsorbers of the fixed bed design, it is preferable to provide for flow through the adsorber and the adsorbent bed in a direction that is in the direction of the force of gravity. This is shown in FIG. 2 where the air stream inlet path means 30 to the adsorbers are positioned at the top of the adsorber and the air stream outlet path means 32 from the adsorbers leading to the vent means 26 is positioned at the bottom of the adsorbers. In this manner, adsorbent at the top of the bed is deactivated before the remaining adsorbent. Deactivation occurs when the adsorbent becomes contaminated such that the regeneration process, and especially temperatures, cannot adequately regenerate the adsorbent. It is then necessary to remove the adsorbent and discard it or reactivate it by known reactivation processes, usually at temperatures higher than are possible in regeneration. Contaminant flow downward through the bed allows the deactivated, top-most layer of the bed to be readily removed by raking or the like. Alternative means for removing the adsorbent first deactivated can be provided.

Regeneration fluid flow through a fixed bed adsorber is preferably as shown, with the regenerating fluid inlet path means 33 at the bottom of the adsorber and the regenerating fluid outlet path means 36 at the top of the adsorber. In this manner, adsorbent nearest the air stream outlet means 32 from the adsorber is thoroughly cleansed of contaminant. Thoroughly cleansed adsorbent nearest the air stream outlet means 32 helps prevent the escape of contaminant out of the outlet means 32 and into the atmosphere. Small amounts of contaminant left on the adsorbent nearest the air stream outlet path means 32 can build up in time to produce a significant concentration of contaminant, which will be carried by the air stream to the atmosphere.

It is preferable to provide at least two adsorbers connected in parallel so that as one adsorber is being regenerated the other may be in use for adsorption, as shown in FIG. 2. Appropriate switching between parallel adsorbers and elsewhere can be accomplished by suitable switching means, including valve means such as valve 35 and others where necessary (not shown), as would be apparent to one skilled in the art. The switching means can be computer controlled with suitable input-output connections 43 to the controlled components, by computer control means 39 for efficiency. Purification of the effluent air stream from paint booths and the like can then be accomplished as a substantially continuous process.

The contaminant rich regenerating product stream leaving the adsorbers through regenerating products outlet path means 36 may contain a variety of contaminants. The composition of the contaminants will vary depending upon the composition of the components of the particular painting process which is being treated.

These often will include contaminants which are readily soluble in the condensed regenerating fluid and contaminants which are not. If steam is used as the regenerating fluid, water insoluble contaminants including hexanes, heptanes, octanes, nonanes, xylenes, naphthas, and mineral spirits, will be relatively easy to separate from the regenerating fluid. An initial separation of these contaminants can be performed mechanically as in the decanting means 40. The regenerating fluid leaving the adsorbers is first compressed if necessary and condensed in condenser means 42 which is supplied with coolant by a coolant supply means 44. The contaminant rich regenerating product stream is separated in the decanting means 40 into an insoluble contaminant rich fraction drawn from the top or bottom of the decanting means, here drawn from the top of the decanter at outlet path means 50, and a soluble contaminant poor fraction here taken from the bottom of the decanter at outlet path means 52. A return path means 51 to the condenser means 42 may optionally be provided to return non-condensed gas or vapor to the condenser means 42. The decanting means 40 can be of any suitable design known for this purpose.

It is sometimes necessary to compress the regenerating product stream to reach the liquid phase prior to decanting. This is shown in FIG. 2 where an alternate path (dashed line) is provided leading from the combined regenerating products outlet path means 41 to a compressor means 37 and then to the condenser means 42. The gases or vapors in the decanting means 40 may not be completely condensed. It is desirable to provide a vent path means 38 to recycle regenerating fluid to the regeneration process. Air left in the adsorber following adsorption will be carried into the regeneration process by the regenerating fluid. This air can be difficult to condense. The vent path means 38 can therefore can be switched to an alternate branch 53 as shown wherein vented air may be returned to the adsorption process.

The contaminant rich fraction leaving the decanting means 40 is removed and preferably is transferred to an incinerator where it is consumed as fuel. A pump means 56 transfers the contaminant rich fraction through a filter or polisher means 58 to a feed drum 60. Pump means 64 meters the flow of contaminants into incinerator means 70. Ambient air is supplied to the incinerator by fan means 74. The contaminants may be consumed as fuels in the incinerator. The contaminant concentration may be high enough such that additional fuel for combustion is not necessary. Supplemental fuels for combustion are, however, sometimes necessary. These may be provided for example as natural gas or fuel oil from supply source means 78 or may consist of other combustible materials available for the specific application. Operating temperatures in the incinerator are preferably maintained at between 700°–2,500° Fahrenheit.

It is also within the scope of the invention to use alternative incineration processes, including catalytic incineration. In any event, the incinerator may not be used to 100 % capacity if it is used only to incinerate contaminants obtained through the process. It is possible to dispose of other combustible materials in the incinerator. This is desirable since the incinerator often must be permitted by the proper government authorities and, as such, should be utilized to the fullest extent possible.

The high heat content of the effluent stream from the incinerator can be used to supply heat where it is needed. It is particularly desirable to use the effluent stream from the incinerator to heat the purified regenerating fluid before it is recycled to the adsorbers for regeneration. A suitable heat exchanger such as waste heat boiler means 80 is provided with incinerator products inlet path means 82 and outlet path means 84. The purified regenerating fluid enters the boiler at inlet path means 90, where it can be supplemented with a stream of make-up regenerating fluid supplied as required from source means 94. The heated regenerating fluid leaves the boiler means 80 through an outlet path means 96 from which it may be supplied to the adsorbers for subsequent use including regenerations, various heat exchange requirements throughout the process, and for separation processes where necessary. The incinerator products leaving the waste heat boiler 80 through outlet path means 84 are vented to the atmosphere by fan means 100 and vent means 101. High boiling contaminants which are not readily separated from the regenerating fluid will gradually collect in the boiler and can be removed through blow-down path means 97 to steam tank means 98 from which they are routed by pump means 99 to the incinerator where they are consumed as fuels.

Depending upon the type and concentration of the contaminants in the effluent air stream from the paint booths and the like, the regenerating fluid leaving the first separation process may be sufficiently free of contaminants so as to be of acceptable purity. If the contaminants are all largely removable with the regenerating fluid, for example, the contaminant poor fraction leaving the decanter 40 through outlet path means 52 may be substantially void of contaminants. This fraction is essentially regenerating fluid and may then be transferred directly to the waste heat boiler for reheating and recycling. It is usually the case, however, that the contaminant poor fraction leaving the first separation process, here the decanting means 40, must be treated by further separation techniques until acceptable purity is obtained. Water soluble contaminants, for example alcohols, ketones, esters and ethers are difficult to separate from steam when it is used as a regenerating fluid. Accordingly, in FIG. 2 there is shown a pump means 104 which transfers the liquid contaminant poor fraction leaving the decanting means 40 to a stripping means such as distillation column 110 through a path means 112. The column 110 may be of any suitable design to perform the separation at hand, depending on process parameters including the regenerating fluid used, the contaminants being separated, temperature, pressure, and inlet and outlet concentrations. The liquid fraction from the decanting means 50 enters the column 110 through inlet path means 112. Hot regenerating fluid, for example steam from the waste heat boiler 80, is fed to the column through a path means 114. An additional hot regenerating fluid inlet 118 is provided from the heat exchanger 16, where the hot regenerating fluid leaving the boiler means 80 received from path means 96 is used to preheat the air stream prior to the adsorption stage.

Purified regenerating fluid leaves the column 110 through an outlet path means 124 where it may be transferred by pump means 126 through column regenerating fluid outlet path means 127 to the waste heat boiler 80 or other suitable heat exchanger. The purified regenerating fluid is heated in the waste heat boiler or heat exchanger in preparation for subsequent uses including regeneration, heat transfer, or separation processes.

The purified product stream leaving the column 110 through outlet path means 124 may contain contaminants which are difficult to separate from the regenerating fluid. In the case where steam or liquid water is the regenerating fluid, butyl carbitols or high boiling glycol ethers may remain in this product stream. It may therefore be necessary to include additional separation process means 129 such as ion exchange, adsorption or adsorption means adapted to remove the particular contaminants at hand.

The vapor phase leaving the top of the column 110 through outlet path means 128 is relatively contaminant rich and is sent to the incinerator 70 for combustion. It is first condensed in condenser means 130, and leaves through an outlet path means 134. The condenser is supplied with a coolant from coolant supply means 136 which leaves the condenser means 130 through an outlet path means 140. The condensed, relatively contaminant rich solution is passed to a reflux drum 144 and leaves the drum through an outlet path means 146. A return path means 145 returns non-condensed gas or vapors to the condenser. Reflux pump means 150 usually returns a portion of the condensate to the column 110 through a reflux path means 154. A portion of the reflux is drawn off through product stream path means 156 and is supplied to feed drum means 60 for subsequent metering to the incinerator 70.

Path means according to the invention can be conduit systems of pipes, fittings, valves, and the like as would be apparent to one skilled in the art. Acid contaminants when present can of course quickly degrade metal components if care is not exercised in material selection. It is necessary to consider the composition of the various streams when selecting materials for the equipment as would be apparent to one skilled in the art. Stainless steel is desirable where metal contacts corrosive streams. This is true not only for the path means, but also for the other components of the invention.

EXAMPLE

The spray paint booths of an automotive assembly plant produce 600,000 standard cubic feet per minute of solvent laden air. The contaminant mass flow rate is approximately 600 lbs./hour. The composition of the solvent laden air, by volume, is 14% hexanes, 34% heptanes, 21% octanes, 2% nonames 1% decanes, 16% toluene, 1% xylenes, 1% methyl ethyl ketone, 1% butyl carbitol and other glycol ethers, and 1% miscellaneous.

The air stream is first passed through a particulate filtration system. The air stream is then passed through a bank of thirteen fixed bed adsorbers connected in parallel. The adsorbers each hour have a design capacity of 50,000 SCFM, and each contain approximately 50,000 lbs. of activated carbon. The air stream flow is downward through the bed. One or more adsorbers are regenerated while the others are used for adsorption. Electronic controllers switch adsorbers between adsorption and regeneration as necessary. The air stream leaving the adsorption beds is substantially void of contaminants. (5-10 PPM)

Regeneration is accomplished by passing low pressure (approximately 50 psi) steam upward through the bed, as shown at the inlet 33 in FIG. 2. The solvent laden steam is condensed in condenser 42 and decanted in decanter 40. The decanter separates the condensed liquid into a contaminant rich fraction and a contaminant poor fraction. Air is vented and recycled to the solvent laden air stream.

The contaminant poor fraction is passed from a distillation column 110 where water soluble contaminants are stripped from the contaminant poor fraction. The distillation column is of the tray type. Steam rising through the column contacts the contaminant poor fluid falling through the column. A portion of the vapors taken from the top of the column are refluxed back to the column.

The relatively contaminant rich vapors not returned to the column are condensed and combined with the contaminant rich fraction taken from the decanter 40. This contaminant rich fraction is metered to an incinerator 70 where the contaminants are consumed as fuels. The contaminants provide 50°-75° of the fuel requirements of the process. Additional requirements are met by fuel supply source 78.

The hot effluent from the incinerator is passed to a waste heat boiler 80 where its heat is used to generate low pressure (20-75 psig) steam, which is returned to the process for regeneration, heat exchange, separation, or anywhere else it is needed. The steam requirements of the system are approximately 10,000-15,000 lbs./hour. Recycled steam accounts for approximately 75°-95° of the steam requirements of the system. Additional steam may be provided through a supply of make-up water to the boiler from water supply means 94. High boiling contaminants which are not readily separated from water will gradually collect in the boiler and can be periodically removed through a blow-down line 47 to the incinerator where they are consumed. The contaminant concentration may be such that the contaminants supply 100° of the fuel requirements of the process, whereby no additional fuel to the incinerator is necessary. Recycled steam can account for up to 95° of the steam requirements of the process. The process of the invention can then be substantially closed-loop with small make-up water requirements, few or no fuel requirements for the incinerator or to generate process steam, and little or no liquid effluent to dispose of.

The above-described embodiment of the invention is seen to provide essentially closed-loop circulation of the regenerating fluid whereby strict environmental standards may be maintained. Recirculation and heat exchanging of the regenerating fluid reduces make-up regenerating fluid requirements and energy consumption. Recirculation of regenerating fluid also reduces regenerating fluid emissions to the atmosphere, with corresponding reductions in rain or ice forming conditions where water or steam is the regenerating fluid. If an incinerator or some other part of the process equipment breaks down, it is a relatively simple matter to route the liquid contaminant rich fractions to storage tanks until such time as the process becomes operational again.

The presence of substances such as sulphur in the exiting gas streams may result in the release of acids into the atmosphere. Sulphur, for example, is often present in the activated carbon, which finds its way to the incinerator and the vent if the effluent from the incinerator is not properly treated. It is therefore sometimes necessary to scrub the gas leaving the incinerator to remove these components. Efficient scrubbing requires lowering the temperature of the exiting gas stream, which can result in the condensation of large amounts of water which must be treated or disposed of as waste. If additional scrubbing of exhaust gas is required, for example for sulphur or chlorides removal, only a small percentage of the total regenerating fluid stream need be condensed, treated and disposed of.

The process of the invention can be utilized to remove a number of contaminants in differing proportions from the air stream effluents of paint booths and the like. The particular selection, sizing and precise layout of the process equipment must of course depend upon the operation parameters and conditions. The number, type, dimensions and design of the adsorbers, incinerators, filters, fans, pumps, columns, tanks, exchangers, compressors, and boilers, for example, may vary. The separation processes may be modified for particular contaninants as necessary. These variations are a function of sound chemical engineering plant design principles. Accordingly, this invention may be embodied in other specific forms without departing from the spirit or essential attributes thereof, and reference should therefore be made to the following claims, rather than the foregoing specification, as indicating the scope thereof.

I claim:

1. A process for the removal and disposal of airborne contaminants from an effluent airstream of paint booths, comprising the steps of:
   (1) passing the airstream through an adsorbent in at least one adsorber in an adsorption step for removing contaminants from said airstream;
   (2) regenerating the adsorbent in the at least one adsorber, the regeneration step comprising a substantially closed loop process, the regeneration step including the steps of passing a stream of regenerating fluid, the regenerating fluid being water or steam, through the adsorber, thereby removing the contaminants from the adsorbent with said regenerating fluid and carrying the contaminants out of the adsorber, the regenerating fluid being recycled at least by the steps of:
      (a) separating the regeneration stream into at least one contaminant rich fraction and at least one contaminant poor fraction;
      (b) separating the contaminant poor fraction of (a) into a contaminant rich fraction and a substantially contaminant free fraction;
      (c) recycling the substantially contaminant free fraction to the at least one adsorber; and,
   (3) subjecting the contaminant rich fractions of steps (2)(a) and (2)(b) to thermal oxidation in an incinerator.

2. The process of claim 1, wherein the regenerating steam in (2) is condensed after leaving the adsorber.

3. The process of claim 2, wherein the separation of step (2)(a) is accomplished by decanting.

4. The process of claim 3, wherein the separation step of (2)(b) is performed in a stripping-rectification column.

5. The process of claim 4, further comprising the step of refluxing a portion of the contaminant rich fraction from the stripping-rectification column back to the stripping-rectification column, whereby the fraction is enriched.

6. The process of claim 4, wherein the regenerating fluid from the bottom of the stripping-rectification column is heated to produce steam prior to the step of passing the regenerating fluid through the at least one adsorber, said heating being accomplished by heat exchange with an exhaust stream from the incinerator.

7. The process of claim 2, wherein the regenerating steam leaving the at least one adsorber is compressed prior to the condensing step.

8. The process of claim 7, further comprising the step of venting non-condensed fluid after the condensing step.

9. The process of claim 8, wherein the non-condensed fluid is air and the venting is to step (1).

10. The process of claim 1, further comprising the step of heating the regenerating fluid prior to step (2)(c), said heating being accomplished by subjecting the substantially contaminant free fraction to heat exchange with an effluent stream from the incinerator.

11. The process of claim 1, wherein the adsorber is selected from the group consisting fixed bed, fluidized bed, rotary bed and compartment adsorbers.

12. The process of claim 1, wherein the at least one adsorber comprises a fixed bed adsorber.

13. The process of claim 12, wherein the airstream is passed through the adsorber substantially in the direction of the force of gravity.

14. The process of claim 13, wherein a top layer portion of adsorbent nearest the airstream inlet is removed when the top layer portion becomes contaminated.

15. The process of claim 14, wherein the regenerating fluid is passed through the adsorber in a direction substantially opposite the direction of the force of gravity.

16. The process of claim 1, further including the step of supplying make-up regenerating fluid to compensate for that portion of the regenerating fluid lost in the process.

17. The process of claim 1, further comprising the step of filtering the airstream for airborne particulates prior to passage into the at least one adsorber.

18. The process of claim 1, wherein the airstream is heated prior to the adsorption step.

19. The process of claim 1, wherein prior to step (2)(c) the substantially contaminant free fraction is subjected to at least one additional contaminant removal step selected from an ion exchange adsorption, and a purification separation step for removing contaminants which are not otherwise readily separated from the regenerating fluid.

20. The process of claim 1, wherein the adsorption step comprises contacting the airstream with at least two adsorption beds connected in series.

21. The process of claim 1, wherein the adsorption step comprises the steps of dividing the airstream into fractions and passing each fraction through one of at least two adsorption beds connected in parallel.

22. The process of claim 1, further comprising a scrubbing step from removing contaminants from at least one fluid stream prior to release of the stream into the atmosphere.

23. The process of claim 1, wherein process operations are computer controlled according to process parameters and monitored process conditions.

24. The process of claim 1, wherein the adsorbent is activated carbon.

25. The process of claim 1, wherein the adsorption step is performed in at least one adsorber simultaneously with the regeneration step in at least one other adsorber, and switching between the adsorbers.

* * * * *